(12) United States Patent
Keskitalo

(10) Patent No.: US 9,992,697 B2
(45) Date of Patent: Jun. 5, 2018

(54) METHOD AND APPARATUS FOR REPORTING OF MEASUREMENT DATA

(75) Inventor: Ilkka Keskitalo, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 812 days.

(21) Appl. No.: 13/578,510

(22) PCT Filed: Nov. 22, 2010

(86) PCT No.: PCT/FI2010/050945
§ 371 (c)(1),
(2), (4) Date: Aug. 10, 2012

(87) PCT Pub. No.: WO2011/098657
PCT Pub. Date: Aug. 18, 2011

(65) Prior Publication Data
US 2012/0311147 A1     Dec. 6, 2012

Related U.S. Application Data

(60) Provisional application No. 61/303,995, filed on Feb. 12, 2010.

(51) Int. Cl.
*H04W 76/02* (2009.01)
*H04W 52/28* (2009.01)
(Continued)

(52) U.S. Cl.
CPC ........... *H04W 24/10* (2013.01); *H04W 24/08* (2013.01)

(58) Field of Classification Search
CPC ................ H04W 24/10; H04L 67/12
(Continued)

(56) References Cited

U.S. PATENT DOCUMENTS 5,806,003 A * 9/1998 Jolma et al. .............. 455/522
6,192,244 B1 * 2/2001 Abbadessa ........... H04W 24/00
                                                            455/424
(Continued)

FOREIGN PATENT DOCUMENTS

CN     101312575 A    11/2008
WO    2000/070897 A1   11/2000
(Continued)

OTHER PUBLICATIONS

Office Action received for corresponding Russian Application No. 2012138291, dated Sep. 16, 2013, 10 pages.
(Continued)

*Primary Examiner* — Kevin Bates
*Assistant Examiner* — Mark A Scott
(74) *Attorney, Agent, or Firm* — Alston & Bird LLP

(57) ABSTRACT

An apparatus, method and computer program product are provided to collect measurement data that may be useful for coverage optimization without having to rely as extensively upon drive tests. In this regard, an apparatus, method and computer program product may be provided for collecting and reporting upon measurement data. Additionally, an apparatus, method and computer program product may be provided for directing the collection of the measurement data and for then receiving a report of the measurement data. A corresponding system for collecting measurement data may also be provided.

22 Claims, 4 Drawing Sheets

(51) Int. Cl.
 *G06F 15/17* (2006.01)
 *H04W 24/10* (2009.01)
 *H04W 24/08* (2009.01)

(58) Field of Classification Search
 USPC .......................................................... 709/224
 See application file for complete search history.

(56) References Cited

U.S. PATENT DOCUMENTS

| | | | | |
|---|---|---|---|---|
| 2004/0018843 | A1* | 1/2004 | Cerwall | H04W 72/02 455/450 |
| 2004/0209569 | A1* | 10/2004 | Heinonen | H04M 1/6066 455/41.2 |
| 2005/0235171 | A1* | 10/2005 | Igari | G06F 1/3228 713/323 |
| 2007/0076641 | A1* | 4/2007 | Bachl | H04W 48/08 370/310 |
| 2007/0232302 | A1* | 10/2007 | Aminov | H04W 36/36 455/433 |
| 2008/0004023 | A1* | 1/2008 | Chen | H04W 52/0229 455/436 |
| 2008/0132225 | A1* | 6/2008 | Ranta et al. | 455/424 |
| 2008/0189970 | A1* | 8/2008 | Wang et al. | 33/701 |
| 2008/0207195 | A1* | 8/2008 | Ranta | H04W 24/10 455/423 |
| 2009/0227251 | A1* | 9/2009 | Lei et al. | 455/425 |
| 2009/0262746 | A1* | 10/2009 | Kwak | H04W 40/00 370/401 |
| 2010/0008323 | A1* | 1/2010 | Deshpande | H04W 48/12 370/331 |
| 2010/0056158 | A1* | 3/2010 | Du | 455/438 |
| 2010/0061356 | A1* | 3/2010 | Qvarfordt | H04J 11/0093 370/338 |
| 2010/0102130 | A1* | 4/2010 | Madej | G06K 7/10 235/462.42 |
| 2010/0195242 | A1* | 8/2010 | Wideman | G11B 15/68 360/71 |
| 2010/0208604 | A1* | 8/2010 | Kazmi | H04W 36/24 370/252 |
| 2010/0317348 | A1* | 12/2010 | Burbidge et al. | 455/436 |
| 2010/0323719 | A1* | 12/2010 | Jen | 455/456.1 |
| 2011/0021216 | A1* | 1/2011 | Pudney | H04W 4/12 455/466 |
| 2011/0098042 | A1* | 4/2011 | Mach et al. | 455/435.1 |
| 2011/0182202 | A1* | 7/2011 | Olofsson et al. | 370/252 |
| 2011/0183662 | A1* | 7/2011 | Lee | H04W 24/10 455/422.1 |
| 2011/0195668 | A1* | 8/2011 | Lee et al. | 455/67.11 |
| 2011/0195714 | A1* | 8/2011 | Sawinathan | H04W 60/005 455/435.1 |
| 2011/0281574 | A1* | 11/2011 | Patel | H04W 56/0015 455/422.1 |
| 2012/0015646 | A1* | 1/2012 | Burbidge et al. | 455/422.1 |
| 2012/0015657 | A1* | 1/2012 | Comsa | H04W 52/0206 455/436 |
| 2012/0307699 | A1* | 12/2012 | Lindoff | H04W 52/0206 370/311 |
| 2012/0309404 | A1* | 12/2012 | Suzuki et al. | 455/450 |

FOREIGN PATENT DOCUMENTS

| | | |
|---|---|---|
| WO | 2006/063309 A2 | 6/2006 |
| WO | 2008/087535 A2 | 7/2008 |
| WO | WO 2009/096846 A1 | 8/2009 |
| WO | 2009105991 | 9/2009 |
| WO | WO-2011/093666 | 8/2011 |

OTHER PUBLICATIONS

3GPP TR 36.805 V2.0.0, 3rd Generation Partnership Project Technical Specification Group Radio Access Network, Study on Minimization of drive-tests in next Generation networks, Mar. 12, 2009, (RP-914120), retrieved from Internet http://www.3gpp.org/ftp/tsg_ran/tsg_ranfTSGR-46/Docs/.

"Evaluation of Control Plane Architecture for Collection and Reporting of UE Measurements", 3GPP TSG-SA5 (Telecom Management) Meeting SA5 #68, S5-093818, Agenda Item: 6.10.2, Motorola, Nov. 9-13, 2009, 4 pages.

"Enhanced Selection of UEs for Collection and Reporting of Measurements", 3GPP TSG-SA5 (Telecom Management) Meeting SA5 #68, S5-093819, Agenda Item: 6.10.2, Motorola, Nov. 9-13, 2009, 5 pages.

"Configuration of UE Measurements for MDT in Idle Mode", 3GPP TSG RAN WG2 Meeting #68-bis, R2-100262, Agenda Item: 4.3.1, Motorola, Jan. 18-22, 2010, 2 pages.

International Search Report and Written Opinion received for corresponding International Patent Application No. PCT/FI2010/050945, dated Mar. 24, 2011, 11 pages.

European Search Report for Application No. 10 84 5629 dated Jun. 30, 2014.

Huawei, *Consideration on CP Solution of Minimization of Drive Test*, 3GPP TSG-RAN WG2 #68, R2-096600 (Mar. 11, 2009) 4 pages (XP050391157).

Sanders, D., (Vodafone), *Retrieval of Trace Records from a UE*, 3GPP TSG-SA5 (Telecom Management) Meeting #50, S5-061647 (Oct. 30-Nov. 3, 2006) 2 pages (XP050208146).

Qualcomm Europe, *Consideration on reporting policy for MDT*, 3GPP TSG-RAN Wg2 meeting #66bis, R2-093709 (Jun. 29-Jul. 3, 2009) 4 pages (XP050351943).

Huawei et al., *New WI proposal for OAM impacts of minimization of drive tests for E-UTRAN and UTRAN*, 3GPP TSG-SA5 (Telecom Management) S5-100162, Meeting SA5#69 (Jan. 18-22, 2010) 6 pages (XP050645673).

Nokia Siemens Networks *Using Cell Trace for MDT*, EGPP TSG-SA5 (Telecom Management) S5-100457, Meeting SA5#69 (Jan. 18-22, 2010) 2 pages (XP 050439704).

3GPP TR 32.827 V1.0.0 Technical Report, $3^{rd}$ Generation Partnership Project; Technical Specification Group Services and System Aspects; Telecommunication management; Integration of device management information with Itf-N (Release 9) (Mar. 2010), 23 pages (XP050402020).

Lehser, F. et al., *The Self-Organizing Networks (SON) Paradigm*, Self-Organizing Networks: Self-Planning, Self-Optimization and Self-Healing for GSM, UMTS and LTE, Chapter 2 (Oct. 27, 2011) pp. 21-46 (XP055123255).

Panasonic. *MTC Device assisted monitoring and status reporting*, 3GPP TSG SA WG2 Meeting #77, TD S2-100262 (Jan. 18-22, 2010), 3 pages.

Motorola, *Triggering of Reporting of MDT Measurements*, 3GPP TSG RAN WG2 Meeting #68-bis, R2-100261 (Jan. 1-22, 2010) 3 pages.

NEC, *Triggers for measurement log reporting*, 3GPP TSG RAN2 Meeting #68bis, R2-100282 (Jan. 18-22, 2010) 3 pages.

Orange, Telecom Italia, Deutsche Telekom, *MDT Measurement Model*, 3GPP TSG-RAN WG2 Meeting #68bis, R2-100239 (Jan. 18-22, 2010).

3GPP TS 37.320 V1.0.0 Technical Specification, $3^{rd}$ Generation Partnership Project; Technical Specification Group TSG RAN Universal Terrestrial Radio Access (UTRA) and Evolved Universal Terrestrial Radio Access (E-UTRA)p; Radio measurement collection for Minimization of Drive Tests (MDT); Overall description; Stage 2 (Release 10) (Aug. 2010) 15 pages.

Qualcomm Europe, TR36.805 v1.2.1 on Study of Minimization of drive-tests in next generation networks, 3GPP TSG-RAN WG2 meeting #68, R2-096717 (Nov. 9-13, 2009) 22 pages.

Office Action for Chinese Application No. 2010800661076 dated July 23, 2014.

Consideration on Reporting Policy for MDT, 3GPP TSG-RAN WG2 meeting #66bis, R2-093709, Qualcomm Europe, 2009 (Jun. 29-Jul. 3, 2009) 3 pages.

$3^{rd}$ Generation Partnership Project; Technical Specification Group TSG RAN Minimization of drive tests for E-UTRAN and UTRAN,

(56) References Cited

OTHER PUBLICATIONS

Overall description; Stage 2 (Release 10) 3GPP TS 37.cde, V0.2.0, 3GPP TSG-RAN WG2 Meeting 368bis, (Jan. 2010), 8 pages.
Retrieval of Trace Records from a UE, SA5, 3GPP TSG-SA5 (Telecom Management), Meeting #50(Oct. 30-Nov. 3, 2006), 3 pages.
Office Action for Chinese Application No. 2010800661076 dated Dec. 23, 2014.
Office Action for Chinese Application No. 201080066107.6 dated Jul. 13, 2015, 7 pages.
Office Action for Vietnamese Application No. 1-2012-02498 dated Aug. 26, 2016, 2 pages.
Office Action for European Patent Application No. 10845629.4 dated Jul. 12, 2017, 7 pages.

\* cited by examiner

US 9,992,697 B2

METHOD AND APPARATUS FOR REPORTING OF MEASUREMENT DATA

RELATED APPLICATION

This application was originally filed as PCT Application No. PCT/FI2010/050945 filed Nov. 22, 2010, which claims priority benefit to U.S. Provisional Patent Application No. 61/303,995, filed Feb. 12, 2010.

TECHNOLOGICAL FIELD

Embodiments of the present invention relate generally to the measurement data collected during an idle state and, in one embodiment, to methods and apparatus for reporting the idle mode measurement data.

BACKGROUND

In a cellular or other wireless network, information regarding radio coverage is instructive for purposes of optimizing the coverage. In this regard, information regarding the radio coverage may be useful for network planning, network optimization, radio resource management parameter optimization and other purposes. Armed with this information, the radio coverage may be enhanced which, in turn, may have a meaningful impact upon the service that may be provided to customers within a particular region.

In order to determine the coverage provided by a radio network, drive tests have been conducted to collect information about the radio coverage. Drive tests may be conducted on a periodic basis and/or in response to certain events. For example, drive tests may be conducted in conjunction with the deployment of a new base station. In this regard, drive tests may be performed both prior to and following service activation of a new base station. The drive tests may collect a variety of measurement data including radio environment measurements such as downlink pilot measurements, transmit power headroom measurements, measurements associated with a random access failure, measurements associated with a paging channel failure and measurements associated with a broadcast channel failure. Based upon the measurement data, initial area tuning may be performed, such as by selection of an appropriate antenna for the new cell, adjustment of antenna tilting of the new base station and neighboring base stations, adjusting the base station transmit power and the like. Following deployment of a new base station, further drive tests may be performed with the resulting measurement data collected by these further drive tests being utilized to provide further area tuning.

Drive tests may also be conducted before and/or after the construction of a new highway, railway or a major building since such construction projects generally represent regions which will experience a population increase which further incents the provision of improved coverage. Additionally, large construction projects may also create new sources of shadowing losses and may need to be addressed to ensure adequate coverage, such as by deploying new base stations, adjusting antenna tilting of existing base stations or the like. Drive tests may also be performed in response to complaints or other issues raised by customers that indicate coverage and/or throughput concerns.

The measurement data collected during drive tests may not only be utilized to effect coverage optimization, but may also be used for a number of other purposes. For example, the measurement data collected during drive tests may be utilized for mobility optimization, capacity optimization, parameterization for common channels, quality of service verification and the like.

For network operators, however, the manual drive tests may disadvantageously cause significant operational costs. For example, drive testing may require the intensive use of the personnel of the network operation and testing may be repeated whenever there are changes in the network topology or configuration.

BRIEF SUMMARY

An apparatus, method and computer program product are provided according to embodiments of the present invention to collect measurement data that may be useful for coverage optimization and/or other purposes without having to rely as extensively upon drive tests. In this regard, an apparatus, method and computer program product are provided for collecting and reporting upon measurement data in accordance with one embodiment of the present invention. Additionally, an apparatus, method and computer program product are provided for directing the collection of the measurement data and for then receiving a report of the measurement data in accordance with another embodiment of the present invention. A corresponding system for collecting measurement data may also be provided.

In one embodiment, an apparatus is provided that includes at least one processor and at least one memory including computer program code. The at least one memory and the computer program code are configured to, with the processor, cause the apparatus to receive measurement configuration information via a broadcast channel during an idle mode. The apparatus of this embodiment is also configured to cause one or more measurements to be made during the idle mode at least partially based upon the measurement configuration information. The apparatus of this embodiment may be further configured to cause an indication that measurement data is available to be provided once in an active mode and in an instance where one or more measurements are made during the idle mode. Further, the apparatus of this embodiment may be able to cause a report of the measurement data to be provided in response to requests from a network node.

A method is provided in accordance with another embodiment which receives measurement configuration information via a broadcast channel during an idle mode and then causes one or more measurements to be made during the idle mode at least partially based upon the measurement configuration information. The method of this embodiment also may cause an indication that measurement data is available to be provided once in an active mode and in an instance in which one or more measurements were made during the idle mode. The method of this embodiment also causes a report of the measurement data to be provided in response to a request from a network node.

A computer program product is provided according to another embodiment which includes at least one computer-readable storage medium having computer-executable program code portions stored therein. The computer-executable program code portions of this embodiment include program code instructions for receiving measurement configuration information via a broadcast channel during an idle mode. The computer-executable program code portions of this embodiment also include program code instructions for causing one or more measurements to be made during the idle mode at least partially based upon the measurement configuration information. In this embodiment, the computer-executable program code portions may also include program code instructions for causing an indication that measurement data is available to be provided once in an active mode and in an instance in which one or more measurements were made during the idle mode. Further, the computer-executable program code portions of this embodiment include program code instructions for causing a report of the measurement data to be provided in response to a request from a network node.

In accordance with another embodiment, an apparatus is provided that includes means for receiving measurement configuration information via a broadcast channel during an idle mode and means for causing one or more measurements to be made during the idle mode at least partially based upon the measurement configuration information. The apparatus of this embodiment may also include means for causing an indication that measurement data is available to be provided once in an active mode and in an instance in which one or more measurements were made during the idle mode. The apparatus of this embodiment also includes means for causing a report of the measurement data to be provided in response to a request from a network node.

An apparatus is provided in accordance with another embodiment that includes at least one processor and at least one memory including computer program code. In this embodiment, the at least one memory and the computer program code are configured to, with the processor, cause the apparatus to at least cause measurement configuration information to be provided via a broadcast channel while a terminal apparatus, e.g., user equipment, is in an idle mode. In one embodiment, the apparatus may also be configured to receive an indication that measurement data is available once the terminal apparatus is in an active mode and in an instance in which one or more measurements were made by the terminal apparatus during the idle mode. The apparatus of this embodiment is also configured to cause a request for a report of the measurement data to be provided, such as in response to receipt of the indication that measurement data is available, and also to receive the report of the measurement data in response to the request. In an alternate embodiment, the apparatus may request the report of the measurement data without any prior indication from the terminal apparatus as to the availability of measurement data, such as in instances in which the collection of measurement data was previously authorized for a cell or other region.

A method is also provided in accordance with another embodiment which causes measurement configuration information to be provided via a broadcast channel while a terminal apparatus, e.g., user equipment, is in an idle mode. In one embodiment, the method may receive an indication that measurement data is available once the terminal apparatus is in an active mode and in an instance in which one or more measurements were made by the terminal apparatus during the idle mode. In this embodiment, the method also causes a request for a report of the measurement data to be provided, such as in response to receipt of the indication that measurement data is available, and thereafter receives the report of the measurement data in response to the request. In an alternate embodiment, the method may request the report of the measurement data without any prior indication from the terminal apparatus as to the availability of measurement data, such as in instances in which the collection of measurement data was previously authorized for a cell or other region.

In accordance with another embodiment, a computer program product is provided that includes at least one computer-readable storage medium having computer-executable program code portions stored therein. The computer-executable program code portions of this embodiment include program code instructions for causing measurement configuration information to be provided via a broadcast channel while a terminal apparatus, e.g., user equipment, is in an idle mode. In one embodiment, the computer-executable program code portions of this embodiment may also include program code instructions for receiving an indication that measurement data is available once the terminal apparatus is in an active mode and in an instance in which one or more measurements were made by the terminal apparatus during the idle mode. In this embodiment, the computer-executable program code portions also include program code instructions for causing a request for a report of the measurement data to be provided, such as in response to receipt of the indication that measurement data is available, and program code instructions for receiving the report of the measurement data in response to the request. In an alternate embodiment, the computer program product may request the report of the measurement data without any prior indication from the terminal apparatus as to the availability of measurement data, such as in instances in which the collection of measurement data was previously authorized for a cell or other region.

An apparatus is provided in accordance with another embodiment that includes means for causing measurement configuration information to be provided via a broadcast channel while a terminal apparatus, e.g., user equipment, is in an idle mode. In one embodiment, the apparatus also means for receiving an indication that measurement data is available once the terminal apparatus is in an active mode and in an instance in which one or more measurements were made by the terminal apparatus during the idle mode. The apparatus of this embodiment also includes means for causing a request for a report of the measurement data to be provided, such as in response to receipt of the indication that measurement data is available, and means for receiving the report of the measurement data in response to the request. In an alternate embodiment, the means for causing a request for a report of the measurement data to be provided may request the report of the measurement data without any prior indication from the terminal apparatus as to the availability of measurement data, such as in instances in which the collection of measurement data was previously authorized for a cell or other region.

A system is also provided in accordance with one embodiment of the present invention. The system of this embodiment includes a terminal apparatus, e.g., user equipment, and a network node configured to provide measurement configuration information to the terminal apparatus via a broadcast channel while the terminal apparatus is in an idle mode. The terminal apparatus of this embodiment is configured to make one or more measurements during the idle mode at least partially based on the measurement configuration information. The terminal apparatus may also provide an indication to the network node that measurement data is available once in an active mode. The network node of this embodiment is further configured to provide a request to the terminal apparatus for a report of the measurement data to be provided in response to the indication that measurement data is available. Further, the terminal apparatus of this embodiment is additionally configured to provide the report of the measurement data in response to the request.

BRIEF DESCRIPTION OF THE SEVERAL VIEWS OF THE DRAWINGS

Figure 1:
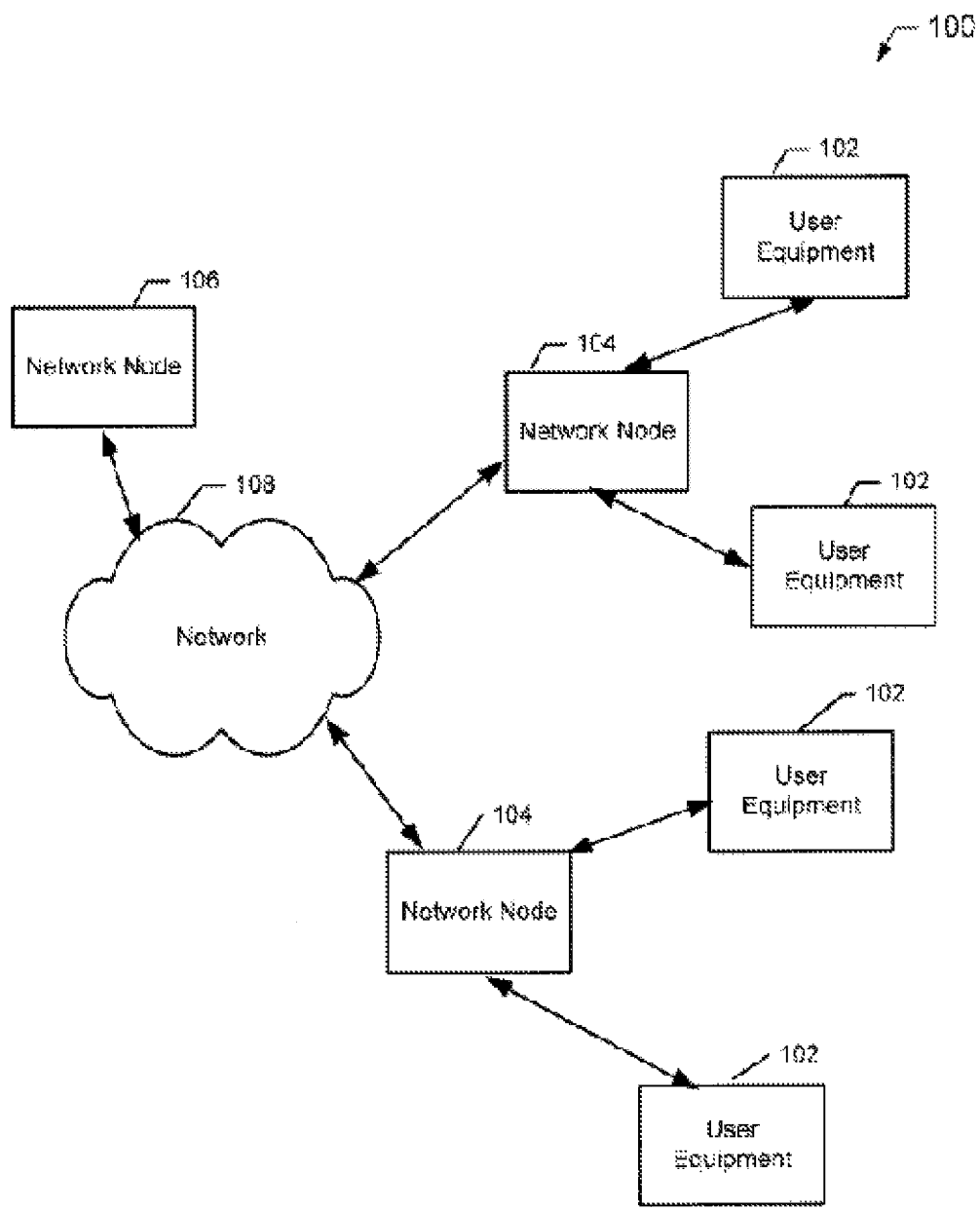
Figure 2:
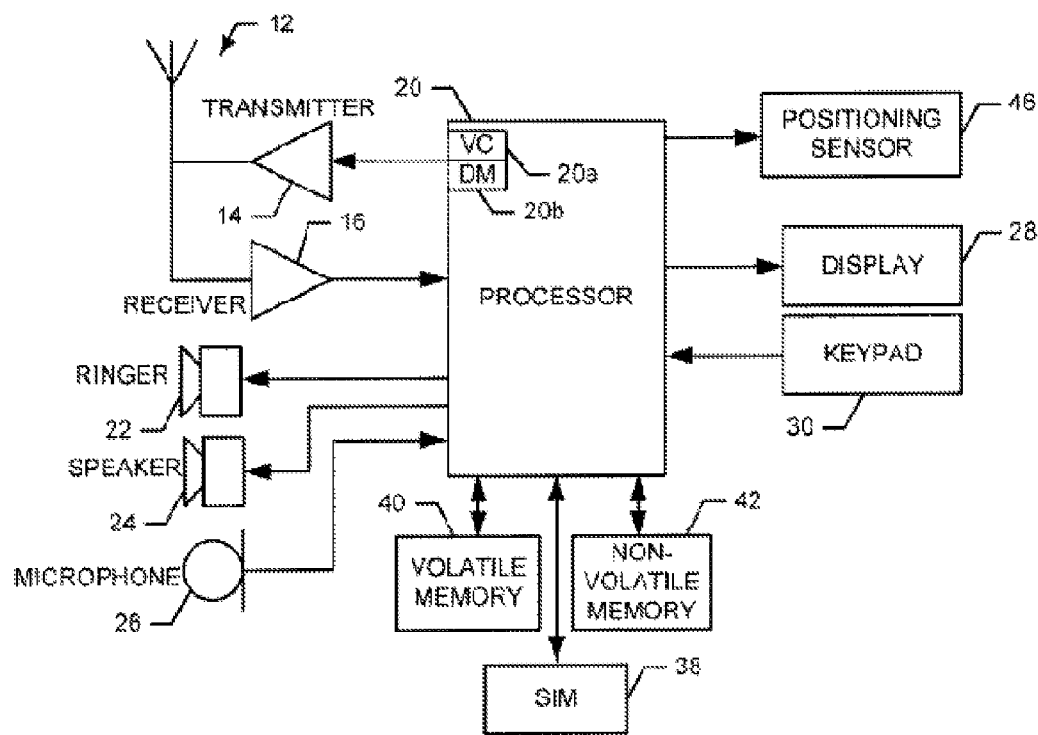
Figure 3:
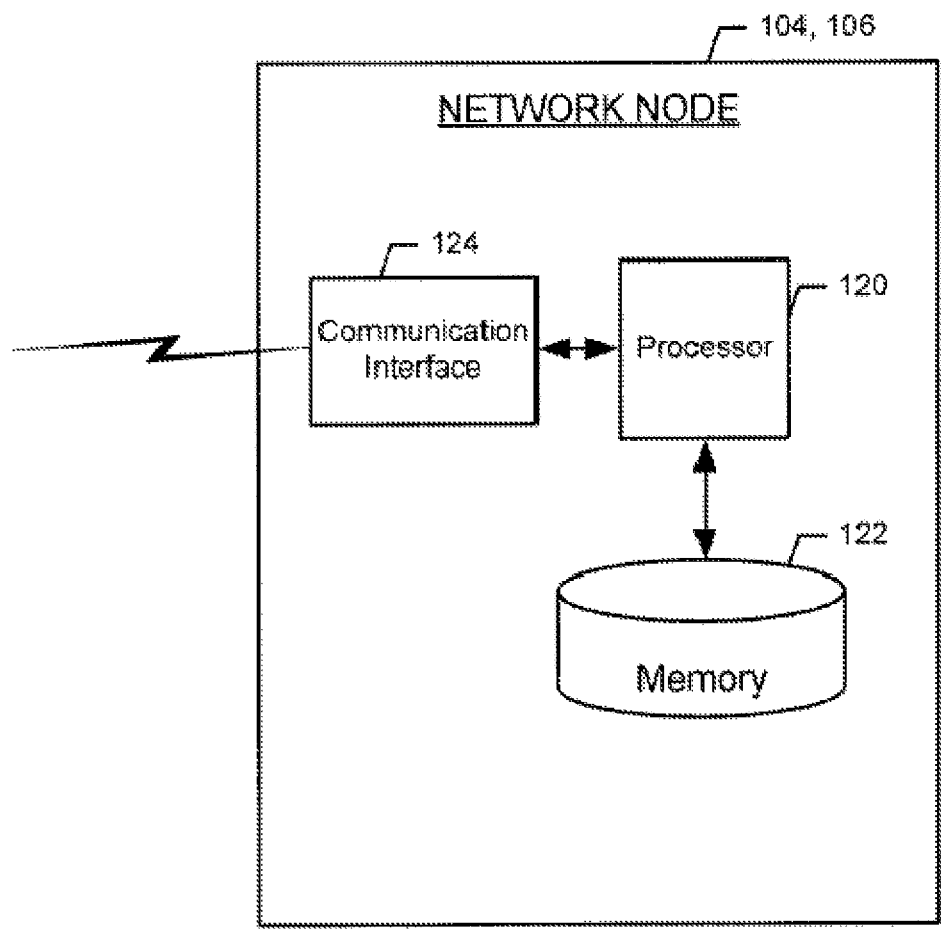
Figure 4:
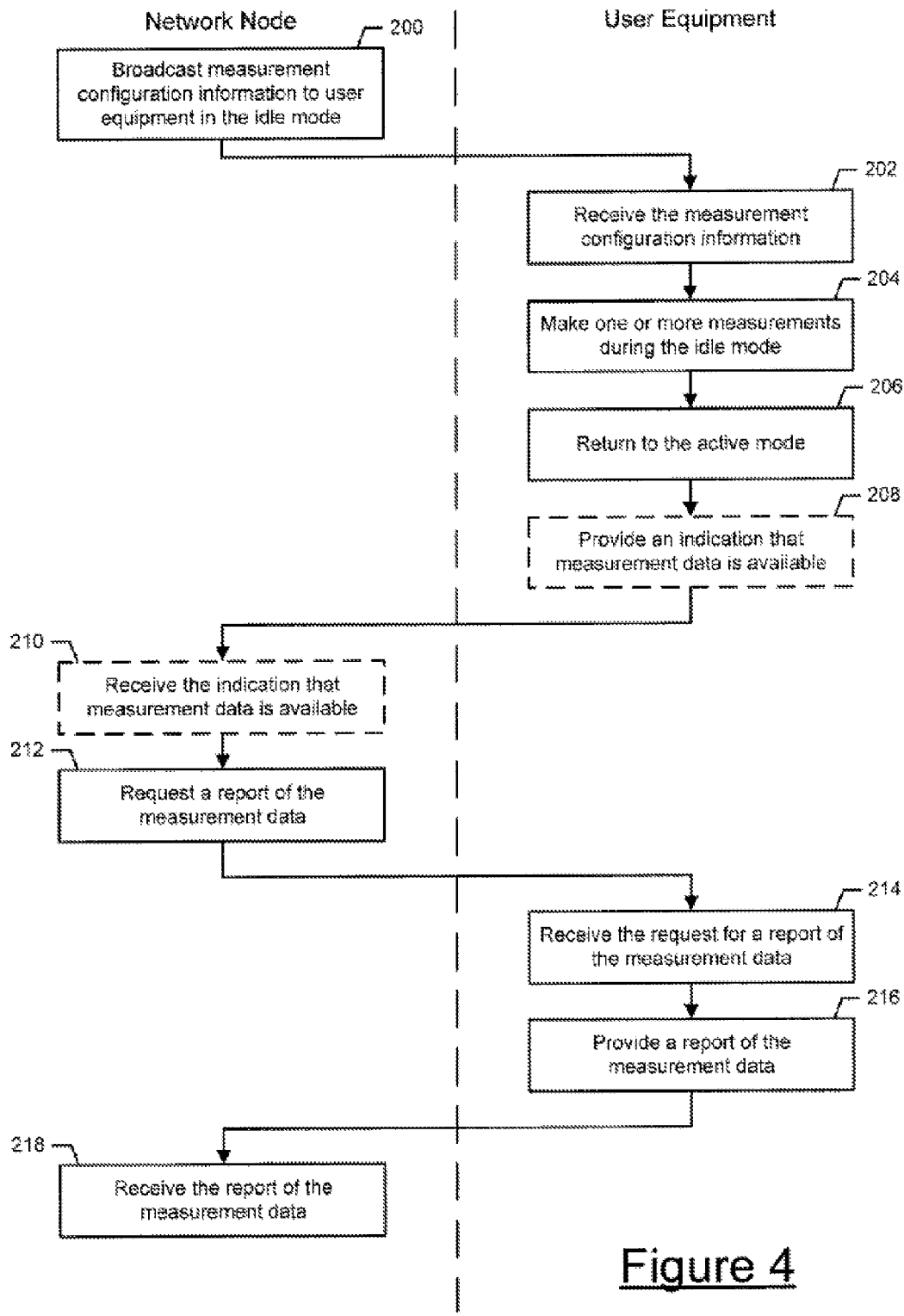

Having thus described embodiments of the invention in general terms, reference will now be made to the accompanying drawings, which are not necessarily drawn to scale, and wherein:

FIG. 1 is a block diagram of a system according to an example embodiment of the present invention;

FIG. 2 is a block diagram of the terminal apparatus, such as a mobile terminal, in accordance with an example embodiment of the present invention;

FIG. 3 is a block diagram of a network node in accordance with an example embodiment of the present invention; and FIG. 4 is a flowchart illustrating operations performed in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of a system 100 for facilitating the collection and reporting of measurement data according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for facilitating the collection and reporting of measurement data, numerous other configurations may also be used to implement embodiments of the present invention. Additionally, while the system is described as collecting measurement data that is consistent with that collected in conjunction with drive tests, other types of measurement data may be collected for other purposes in accordance with other embodiments of the present invention, either in addition to or instead of the measurement data that is collected to replace or at least reduce drive tests. In at least some embodiments, the system 100 includes one or more terminal apparatus 102 and one or more network nodes 104. In at least some embodiments, the system 100 further comprises a network 108. The network 108 may comprise one or more wireline networks, one or more wireless networks, or some combination thereof. In one embodiment, the network 108 comprises a public land mobile network (e.g., a cellular network), such as may be implemented by a network operator (e.g. a cellular access provider). The network 108 may operate in accordance with universal terrestrial radio access network (UTRAN) standards, evolved UTRAN (E-UTRAN) standards, GSM (Global System for Mobile communications) EDGE (Enhanced Data GSM Environment) radio access network (GERAN) standards and/or the like. It will be appreciated, however, that where references herein are made to a network standard and/or terminology particular to a network standard, the references are provided merely by way of example and not by way of limitation.

The network node 104 may comprise any network entity configured to communicate with a terminal apparatus in regards to the collection and reporting of measurement data. In this regard, the network node 104 may comprise, for example, a base station (BS), such as an eNode B (eNB) in accordance with the E-UTRAN standard. As such, in some embodiments, the network node 104 is configured to provide access to the network 108 to the terminal apparatus 102.

Although the network node 104 may process and analyze the measurement data, the system 100 of one embodiment includes another network node 106 which may be configured to receive the measurement data from one or more network nodes 104 and to provide a more centralized hub for processing and analyzing the measurement data. While the network node 106 that is configured to process and analyze the measurement data may also serve as a network node 104 that communicates with the terminal apparatus 102, the network node 106 of one embodiment that is configured to process and analyze the measurement data may be a network node, such as a server or other computing device, within the network management system (NMS).

In order to reduce the reliance upon manual drive testing and to correspondingly reduce the associated operational costs, a terminal apparatus 102 may be utilized in accordance with example embodiments of the present invention to collect and report measurement data while otherwise deployed for normal usage. The measurement data may be collected by one or more network nodes 104 for processing and analysis, such as in an off-line manner, in order to discover potential issues, if any, in the network 108, such as issues relating to coverage or capacity, issues relating to the settings of various network parameters and the like. Thus, example embodiments of present invention support the terminal apparatus 102 in its collection and reporting of measurement data to the network 108 so that the network operator can substitute the measurement data collected by the terminal apparatus for at least part of the measurement data otherwise collected by manual drive testing. As described below, the terminal apparatus 102 may be configured to make the measurements during the idle mode with the resulting measurement data then being reported to the network node 104 in an effective and efficient manner.

The terminal apparatus 102 may be embodied as user equipment (UE), such as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like. In an exemplary embodiment, the terminal apparatus 102 is embodied as a mobile terminal, such as that illustrated in FIG. 2.

In this regard, FIG. 2 illustrates a block diagram of a mobile terminal 10 representative of one embodiment of a terminal apparatus 102 in accordance with embodiments of the present invention. It should be understood, however, that the mobile terminal 10 illustrated and hereinafter described is merely illustrative of one type of terminal apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. The signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9 G wireless communication protocols such as Long Term Evolution (LTE) or E-UTRAN and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (Wi-MAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

The mobile terminal 10 may comprise memory, such as one or more subscriber identity modules (SIMs) 38, universal SIMs (USIMs), removable user identity modules (R-UIMs), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may store instructions which, when executed by the processor, cause the processor to perform the functions described herein. The memories may also comprise an identifier, such as an international mobile equipment identification (IMEI) code, capable of uniquely identifying the mobile terminal 10.

The mobile terminal 10 may include a positioning sensor 46. The positioning sensor 46 may include, for example, a global positioning system (GPS) sensor, an assisted global positioning system (Assisted-GPS) sensor, etc. In one embodiment, however, the positioning sensor 46 includes a pedometer or inertial sensor. Further, the positioning sensor 46 may determine the location of the mobile terminal 10 based upon signal triangulation or other mechanisms. The positioning sensor 46 is capable of determining a location of the mobile terminal 10, such as latitude and longitude coordinates of the mobile terminal or a position relative to a reference point such as a destination or a start point. Information from the positioning sensor 46 may be communicated to a memory 40, 42 of the mobile terminal 10 or to another memory device to be stored as a position history or location information. Furthermore, the memory 40, 42 of the mobile terminal 10 may store instructions for determining cell id information. In this regard, the memory 40, 42 may store an application program for execution by the processor 20, which determines an identity of the current cell, e.g., cell id identity or cell id information, with which the mobile terminal 10 is in communication. In conjunction with the positioning sensor 46, the cell id information may be used to more accurately determine a location of the mobile terminal 10.

FIG. 3 illustrates a block diagram of a network node. Although described hereinafter in conjunction with a network node 104 for facilitating the collection and reporting of measurement data according to an exemplary embodiment of the present invention, the network node of FIG. 3 may also represent a network node 106, such as a server or other computing device, that is configured, in accordance with one embodiment of the present invention, to process and analyze the measurement data, such as in a centralized fashion. In the context of a network node 104, the network node of the illustrated embodiment includes various means, such as a processor 120, memory 122 and communication interface 124 for performing the various functions herein described. These means of the network node 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 122) that is executable by a suitably configured processing device (e.g., the processor 120), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 120 comprises a plurality of processors. The plurality of processors may be in operative communication with each other and may be collectively configured to perform one or more functionalities of the network node 104 as described herein. The plurality of processors may be embodied on a single computing device or distributed across a plurality of computing devices collectively configured to perform one or more functionalities of the network node 104 as described herein. In an exemplary embodiment, the processor 120 is configured to execute instructions stored in the memory 122 or otherwise accessible to the processor 120. These instructions, when executed by the processor 120, may cause the network node 104 to perform one or more of the functionalities of the network node 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may include, for example, volatile and/or non-volatile memory. Although illustrated in FIG. 3 as a single memory, the memory 122 may comprise a plurality of memories. The plurality of memories may be embodied on a single computing device or distributed across a plurality of computing devices. The memory 122 may comprise volatile memory, non-volatile memory, or some combination thereof. In this regard, the memory 122 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the network node 104 to carry out various functions in accordance with exemplary embodiments of the present invention. For example, in at least some embodiments, the memory 122 is configured to buffer input data for processing by the processor 120. Additionally or alternatively, in at least some embodiments, the memory 122 is configured to store program instructions for execution by the processor 120. The memory 122 may store information in the form of static and/or dynamic information. This stored information may be stored and/or used by the processor 12 during the course of performing its functionalities.

The communication interface 124 may be embodied as any device or means embodied in circuitry, hardware, a computer program product comprising computer readable program instructions stored on a computer readable medium (e.g., the memory 122) and executed by a processing device (e.g., the processor 120), or a combination thereof that is configured to receive and/or transmit data from/to an entity of the system 100, such as, for example, a terminal apparatus 102. In at least one embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more entities of the system 100. The communication interface 124 may be configured to receive and/or transmit data using any protocol that may be used for communications between entities of the system 100. The communication interface 124 may additionally be in communication with the memory 122, such as via a bus.

The interaction of the network node 104 and the terminal apparatus 102 in accordance with one embodiment of the present invention is depicted in FIG. 4. In this regard, the operations performed by the network node 104 are depicted on the left hand side of FIG. 4, while the operations performed by the terminal apparatus 102 are shown on the right hand side of FIG. 4. As shown in block 200 of FIG. 4, the network node 104 is configured to transmit measurement configuration information via a broadcast channel to the terminal apparatus 102 while the terminal apparatus is in an idle mode. In addition to the measurement configuration information, the network node 104 may also be configured to transmit reporting configuration information via the broadcast channel to the terminal apparatus 102 while the terminal apparatus is in the idle mode. For example, the network node 104 may include means, such as the communication interface 124 and/or the processor 120, for causing the measurement configuration information and/or the reporting configuration information to be transmitted.

In one embodiment, the network node 104 is configured to transmit the measurement configuration information as system information via a broadcast channel. In conjunction with the E-UTRAN standard, for example, the network node, e.g., eNB, may be configured to transmit the measurement configuration and/or reporting configuration information in one or more system information blocks. In this regard, the network node may include the measurement configuration information and/or the reporting configuration information as new information elements within an existing system information block or a new system information block may be created for carrying the measurement configuration information and/or the reporting configuration information. In instances in which a new system information block is created, the priority and periodicity of the new system information block may be defined so that the reception of the new system information block by the terminal apparatus 102 while in the idle phase will not adversely impact other activity performed by the terminal apparatus while in the idle phase.

The network node 104 may be triggered to transmit the measurement configuration information upon determining that a terminal apparatus 102 has entered the idle mode, such as indicated by the information exchanged between a network node and the terminal apparatus in conjunction with the entry of the terminal apparatus into the idle mode. Alternatively, the network node 104 may be configured to transmit the measurement configuration information on a periodic basis to each terminal apparatus 102 that is in the idle mode at the time of receipt of the measurement configuration information. Still further, the network node 104 may be configured to transmit the measurement configuration information in accordance with other schedules or in response to other triggers.

The network node 104 may provide various types of measurement configuration information that includes one or more of the following: the quantity the terminal apparatus 102 should measure, the quantities that the terminal apparatus should include in a report, the length of the period over which the terminal apparatus is to make measurements, the states of the terminal apparatus in which the measurements are valid, and the geographical area in which the terminal apparatus is to make the measurements, such as the area supported by the network node or the like.

In response, the terminal apparatus 102 is configured to receive the measurement configuration information and/or the reporting configuration information via the broadcast channel during the idle mode, as shown in operation 202 of FIG. 4. For example, the terminal apparatus 102 may include means, such as the antenna 12, the receiver 16 and/or the processor 20, for receiving the measurement configuration information and/or the reporting configuration information. The terminal apparatus 102 may then make one or more measurements during the idle mode in accordance with the measurement configuration information that has been received. See operation 204 of FIG. 4. In this regard, the terminal apparatus 102 may include means, such as the processor 20, configured to cause one or more measurements to be made while in the idle mode based upon the measurement configuration information. The terminal apparatus 102 and, in one embodiment, the processor 20 of the terminal apparatus, may be configured to make a variety of measurements. In one embodiment, the terminal apparatus 102 is configured to make a variety of measurements relating to the radio environment including, for example, downlink pilot measurements, such as common pilot channel (CPICH) received signal code power (RSCP), CPICH Ec/No, time division duplex (TDD) primary-common control physical channel (P-CCPCH) RSCP and interference signal code power (ISCP), reference signal received power (RSRP) and reference signal received quality (RSRQ) on a periodic basis, in instances in which the performance of the network node 104, e.g., the serving base station, becomes worse than a predefined threshold. In addition to the measurement data, the terminal apparatus 102, such as the processor 20 and/or an associated positioning sensor, may also determine the location of the terminal apparatus at the time of a measurement, the time when the measurement takes place and/or the cell identification of the network node 104, e.g., the serving base station, at the time that the measurement took place. This additional data may be associated with the measurement data to provide further explanation and/or context for the measurement data.

Additionally, the terminal apparatus 102, such as, in one embodiment, the processor 20, may make measurements of the radio environment (including, for example, those noted above) in other instances, such as in the event of a random access failure, a paging channel failure and/or a broadcast channel failure. In instances in which the measurements occur as a result of the paging channel failure, the terminal apparatus 102 may note that it has failed to decode the paging control channel (PCCH) consecutively for a predefined number, e.g., X1, of times even though the terminal apparatus had managed to decode the physical downlink control channel (PDCCH) at its paging occasion. In this instance, the terminal apparatus 102, such as the processor 20, may be configured to measure the average RSRP and RSRQ over time from the first PCCH decoding failure to the X1th PCCH decoding failure. Along with these measurements of the radio environment, the terminal apparatus 102, such as the processor 20, may also be configured to determine the location associated with each failed attempt to decode the PCCH, the time at which the X1th PCCH decoding failure occurred and the identity of the base station when the PCCH decoding failure occurred. In regards to the measurement data collected in response to a broadcast channel failure, the terminal apparatus 102, such as the processor 20, may determine the average RSRP and RSRQ over time when the physical broadcast channel (P-BCH), PDCCH or downlink synchronization channel (DL-SCH) cannot be decoded. In addition to the measurement data, the terminal apparatus 102, such as the processor 20, may also be configured to determine the broadcast channel type for which a failure occurred, the location at which the decoding failure occurred, the time at which the decoding failure occurred, the identity of the base station when the decoding failure occurred and the carrier frequency of the base station when the decoding failure occurred.

While in the idle mode, the terminal apparatus 102, such as the processor 20, may continue to make the measurements, such as on a periodic basis and/or in response to predefined events as described above. Thereafter, as indicated by operation 206 of FIG. 4, the terminal apparatus 102 may return to the active mode and may communicate with the network node 104 via the signaling channels in order to set up a connection. In one embodiment, the terminal apparatus 102, such as the processor 20, may provide an indication to the network node 104 as to whether or not measurement data was collected and is available from the period of time in which the terminal apparatus was in the idle mode. See operation 208 of FIG. 4. For example, the terminal apparatus 102 may include means, such as the processor 20, for causing the indication of the availability of measurement data to be provided. In this regard, the terminal apparatus 102 may provide the indication as part of the setup procedure during the transition to the active mode or following resumption of the active mode. In one embodiment, the terminal apparatus 102, such as the processor 20, may be configured to provide a single bit having one state indicative of the availability of measurement data and another state indicative of the lack of any measurement data. In addition, the terminal apparatus 102, such as the processor 20, of one embodiment may also provide additional information relating to the measurement data, such as an indication regarding the quantity of measurement data, to assist the network node 104 in planning for the retrieval of the measurement data. As indicated by the dashed lines about block 208 in FIG. 4 and as described below, the terminal apparatus 102 of other embodiments need not provide an indication to the network node 104 as to the availability of measurement data and, instead, the network node may request the measurement data, if any, from a terminal apparatus entering the active mode as a result, for example, of knowledge by the network node that the terminal apparatus within the coverage area of the network node had been previously configured to collect measurement data while in the idle mode.

As indicated by operation 210, the network node 104 of this embodiment receives the indication of the availability of measurement data from the terminal apparatus 102. For example, the network node 104 may include means, such as the communication interface 124 and/or the processor 120, for receiving the indication as to the availability, or not, of the measurement data. In instances in which the terminal apparatus 102 provides additional information regarding the measurement data, such as an indication as to the quantity of the measurement data, the network node 104, such as the communication interface 124 and/or the processor 120, may also receive this additional information. The network node 104 may then determine if measurement data is available and, if so, may issue a request to the terminal apparatus 104 for a report of the measurement data. See operation 212 of FIG. 4. For example, the network node 104 may include means, such as the processor 120 and/or the communication interface 124, for causing a request to be issued for a report of the measurement data. As the network node 104 is directing the provision of the measurement data by the terminal apparatus 102, the network node may control the timing of the delivery of the measurement data. In this regard, the network node 104 may be configured to issue the request to the terminal apparatus 102 such that the measurement data is provided, for example, during a period of relatively low utilization of the network 108 so as to not increase the network load in instances in which the network is more fully loaded. In other embodiments, the network node 104 may be configured to request the measurement data in response to one or more predefined triggers, such as a trigger based upon a predefined time, based on a predefined period, based on demand, based upon the location of the terminal apparatus 102, based upon the amount of memory utilized by the terminal apparatus for storage of the measurement data (as may be determined, for example, based upon the indication as to the quantity of the measurement data) and in instances in which the terminal apparatus is terminating its measurement data logging, such as by being handed over to another base station or the like.

Additionally, the network node 104 may consider additional information provided by the terminal apparatus 102 in conjunction with the measurement data, such as information regarding the quantity of measurement data. As such, in instances in which the measurement data is a relatively large quantity, the network node 104 may only request the delivery of a report of the measurement data in instances in which the utilization of the network 108 is relatively low. Alternatively, in instances in which the quantity of measurement data is relatively small, the network node 104 may not be constrained in a similar fashion and may issue a request for a report of the measurement data regardless of the utilization of the network 108.

The terminal apparatus 102 may be configured to receive the request for a report of the measurement data and, in response, provide the report of the measurement data as indicated by operations 214 and 216 of FIG. 4. In this regard, the terminal apparatus 102 may include means, such as the antenna 12, the receiver 16 and/or the processor 20, for receiving the request to provide a report of the measurement data and means, such as the processor 20, for causing the report of the measurement data to be provided. In instances in which the request for the measurement data provided by the network node 104 defines the conditions under which the report is to be made, such as the time period during which the report should be made or the like, the terminal apparatus 102 may also be configured to recognize these conditions and to provide the report of the measurement data in conformance with these conditions. The network node 104, in turn, is configured to receive the report of the measurement data. See operation 218 of FIG. 4. In this regard, the network node 104 may include means, such as the communication interface 124 and/or the processor 120, for receiving the report of the measurement data.

The measurement data may then be analyzed, typically in conjunction with the measurement data provided by a number of other terminal apparatus 102, to determine the coverage provided by the network node 104, such as a base station. If appropriate, the coverage provided by the network node 104, such as a base station, may be adjusted, such as by deploying additional base stations, adjusting antenna tilting of existing base stations, adjusting base station transmit power or the like. By collecting the measurement data with terminal apparatus 102 in the idle mode, however, the reliance upon drive tests to collect the measurement data may be reduced. As such, the operational costs associated with the drive tests and the resulting environmental impact occasioned by the drive tests may be advantageously reduced. Moreover, by permitting the network node 104 of one embodiment to provide the measurement configuration information to the terminal apparatus 102, the network node may control the type of measurement data that is to be collected. In addition, by merely having the terminal apparatus 102 of one embodiment provide an indication as to the availability of measurement data upon its return to the active mode, the network node 104 may determine an appropriate time in which to request delivery of the measurement data by taking into account, for example, the network conditions. Further, by permitting the network node 104 of one embodiment to both provide the measurement configuration information and direct the reporting of the resulting measurement data, the logic that must be implemented by the terminal apparatus 102 may be simplified with less reliance upon triggers implemented by the terminal apparatus or the like.

While the network node 104 may process and analyze the measurement data, the system 100 of one example embodiment may include another network node 106. In this embodiment, the network nodes 104 that interact directly with the terminal apparatus 102 may be configured to provide the measurement data that is collected from the terminal apparatus to the network node 106. The network node 106 may, in turn, be configured to process and analyze the measurement data from one or more network nodes 104 on a more centralized basis Based upon the analysis provided by the network node 106 in this embodiment, system-wide issues may be identified as a result of its more centralized position within the system 100.

The operations described above in conjunction with FIG. 4 may be varied in other embodiments while still collecting measurement data during the idle mode and then reporting the measurement data under the direction of the network node 104. For example, the terminal apparatus 102 may be configured in such a manner that no indication is provided upon returning to the active mode as to whether or not measurement data has been collected. In this embodiment, the network node 104 may be configured to request a report of measurement data from each terminal apparatus 102 that communicates with the network node to enter the active mode. For example, the reporting request may be sent to only selected terminal apparatus 102 to avoid, for example, excessive traffic load due to the measurement reporting. In accordance with this embodiment, some terminal apparatus 102 may have collected measurement data while in the idle mode and may therefore be capable of providing a report of the measurement data to the network node 104, while other terminal apparatus may not have collected measurement data while in the idle mode and, as a result, may not provide a report of measurement data to the network node.

As described above FIG. 4 is a flowchart of a system, method, and computer program product according to exemplary embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product which embodies the procedures described herein as being performed by the network node 104 may be stored by one or more memory devices 122 of the network node, such as a base station or other computing device, and executed by the processor 120 of the network node, while the computer program product which embodies the procedures described herein as being performed by the terminal apparatus 120 may be stored by one or more memory devices 40, 42 of the terminal apparatus and executed by the processor 20 of the terminal apparatus. In some embodiments, the computer program instructions comprising the computer program product(s) which embody the procedures described above may be stored by memory devices of a plurality of computing devices, such as the network node and the terminal apparatus. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., a terminal apparatus 102 and/or network node 104) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions for performing the specified functions. It will also be understood that one or more blocks of the flowchart, and combinations of blocks in the flowchart, may be implemented by special purpose hardware-based computer systems which perform the specified functions or combinations of special purpose hardware and computer program product(s).

The above described functions may be carried out in many ways. For example, any suitable means for carrying out each of the functions described above may be employed to carry out embodiments of the invention. In one embodiment, suitably configured processors 20, 120 of the terminal apparatus 102 and the network node 104 may provide means for performing their respective functions, as shown in FIG. 4 and described above. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing description and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

The invention claimed is:

1. An apparatus comprising at least one processor and at least one memory including computer program code, the at least one memory and the computer program code configured to, with the at least one processor, cause the apparatus to:
provide that one or more measurements are to be made during an idle mode at least partially based upon measurement configuration information;
provide that an indication that measurement data is available is to be sent during or following a transition to an active mode; and
provide that a report of the measurement data is to be sent in response to a request for the measurement data.

2. An apparatus according to claim 1 further configured to provide that an indication that measurement data is available is to be sent by providing that a single bit indicative of whether measurement data is available is to be sent during or following a transition to an active mode.

3. An apparatus according to claim 1 further configured to provide that an indication that measurement data is available is to be sent by providing that the indication that measurement data is available is to be sent in an instance where one or more measurements were made during the idle mode.

4. An apparatus according to claim 1 further configured to receive the measurement configuration information prior to providing for one or more measurements to be made.

5. An apparatus according to claim 4 further configured to receive the measurement configuration information via a broadcast channel during the idle mode.

6. An apparatus according to claim 1 or 2, wherein the apparatus is configured to provide the indication as part of a setup procedure during the transition to the active mode.

7. An apparatus according to claim 1 further configured to:
determine additional data including at least one of a location of the apparatus when a measurement is made, a time at which a measurement is made or a cell identification of a network node when a measurement is made; and
associate the additional data with the measurement data.

8. An apparatus according to claim 1 further configured to provide that an indication is to be sent regarding a quantity of measurement data that is available.

9. An apparatus according to claim 1 wherein the apparatus comprises or is embodied on a mobile terminal, and wherein the mobile terminal comprises user interface circuitry configured to facilitate control of at least some functions of a user interface of the mobile terminal.

10. A method comprising:
providing, using a processor, that one or more measurements are to be made during an idle mode at least partially based upon measurement configuration information;
providing that an indication that measurement data is available is to be sent during or following a transition to an active mode; and
providing that a report of the measurement data is to be sent in response to a request for the measurement data.

11. A method according to claim 10 wherein providing that an indication that measurement data is available is to be sent comprises providing that a single bit indicative of whether measurement data is available is to be sent during or following a transition to an active mode.

12. A method according to claim 10 wherein providing that an indication that measurement data is available is to be sent comprises providing that the indication that measurement data is available is to be sent in an instance where one or more measurements were made during the idle mode.

13. A method according to claim 10 further comprising receiving the measurement configuration information prior to providing for one or more measurements to be made.

14. A method according to claim 13 wherein receiving the measurement configuration information comprises receiving the measurement configuration information via a broadcast channel during the idle mode.

15. A method according claim 10, wherein the indication is provided as part of a setup procedure during the transition to the active mode.

16. A method according to claim 10 further comprising:
determining additional data including at least one of a location of the apparatus when a measurement is made, a time at which a measurement is made or a cell identification of a network node when a measurement is made; and
associating the additional data with the measurement data.

17. A method according to claim 10 further comprising providing that an indication regarding a quantity of measurement data that is available is also to be sent.

18. A computer program product comprising at least one non-transitory computer-readable storage medium having computer-executable program code instructions stored therein, the computer-executable program code instructions including program code instructions to:
provide that one or more measurements are to be made during an idle mode at least partially based upon measurement configuration information;
provide that an indication that measurement data is available is to be sent during or following a transition to an active mode; and
provide that a report of the measurement data is to be sent in response to a request for the measurement data.

19. An apparatus comprising at least one processor and at least one memory including computer program code, the at least one memory and the computer program code configured to, with the at least one processor, cause the apparatus to:
- receive an indication that measurement data is available during or following a transition of a terminal apparatus to an active mode;
- provide that a request for a report of the measurement data is to be sent in response to receipt of the indication that measurement data is available; and
- receive the report of the measurement data in response to the request.

20. An apparatus according to claim 19 configured to receive the indication that measurement data is available as part of a setup procedure during the transition to the active mode.

21. A method comprising:
- receiving, at a processor, an indication that measurement data is available during or following a transition of a terminal apparatus to an active mode;
- providing that a request for a report of the measurement data is to be sent in response to receipt of the indication that measurement data is available; and
- receiving the report of the measurement data in response to the request.

22. A method according to claim 21 wherein receiving an indication that measurement data is available comprises receiving the indication as part of a setup procedure during the transition to the active mode.

* * * * *